(12) United States Patent
Ablabutyan et al.

(10) Patent No.: US 7,931,433 B2
(45) Date of Patent: Apr. 26, 2011

(54) APPARATUS FOR LEVEL RIDE LIFT

(75) Inventors: Karapet Ablabutyan, Glendale, CA (US); Akop Gasparian, Panorama, CA (US)

(73) Assignee: Maxon Lift Corporation, Santa Fe Springs, CA (US)

( * ) Notice: Subject to any disclaimer, the term of this patent is extended or adjusted under 35 U.S.C. 154(b) by 99 days.

(21) Appl. No.: 12/420,959

(22) Filed: Apr. 9, 2009

(65) Prior Publication Data

US 2009/0191037 A1    Jul. 30, 2009

Related U.S. Application Data

(63) Continuation of application No. 11/100,805, filed on Apr. 6, 2005, now Pat. No. 7,556,467.

(51) Int. Cl.
*B60P 1/44* (2006.01)

(52) U.S. Cl. ........................................................ 414/557

(58) Field of Classification Search .................. 414/546, 414/556, 557
See application file for complete search history.

(56) References Cited

U.S. PATENT DOCUMENTS

| 4,447,031 A | 5/1984 | Souder, Jr. et al. |
| 4,711,613 A | 12/1987 | Fretwell |
| 4,836,736 A | 6/1989 | Neagu |
| 4,930,973 A | 6/1990 | Robinson |
| 5,261,779 A | 11/1993 | Goodrich |
| 5,944,473 A | 8/1999 | Saucier et al. |
| 6,065,924 A | 5/2000 | Budd et al. |
| 6,086,312 A | 7/2000 | Ziaylek et al. |
| 6,390,343 B1 | 5/2002 | Jain |
| 6,739,824 B2 | 5/2004 | Dupuy et al. |
| 7,556,467 B2 * | 7/2009 | Ablabutyan et al. .......... 414/557 |
| 2002/0182045 A1 | 12/2002 | Ablabutyan et al. |

* cited by examiner

*Primary Examiner* — Charles A Fox
(74) *Attorney, Agent, or Firm* — Tutunjian & Bitetto, P.C.

(57) ABSTRACT

A lift having a platform with a substantially level ride is described. The lift reduces the distance between the ground and the platform in the ground position. An extension plate having receiving portions for accommodating portions of the lift when the platform is in a bed level position.

4 Claims, 23 Drawing Sheets

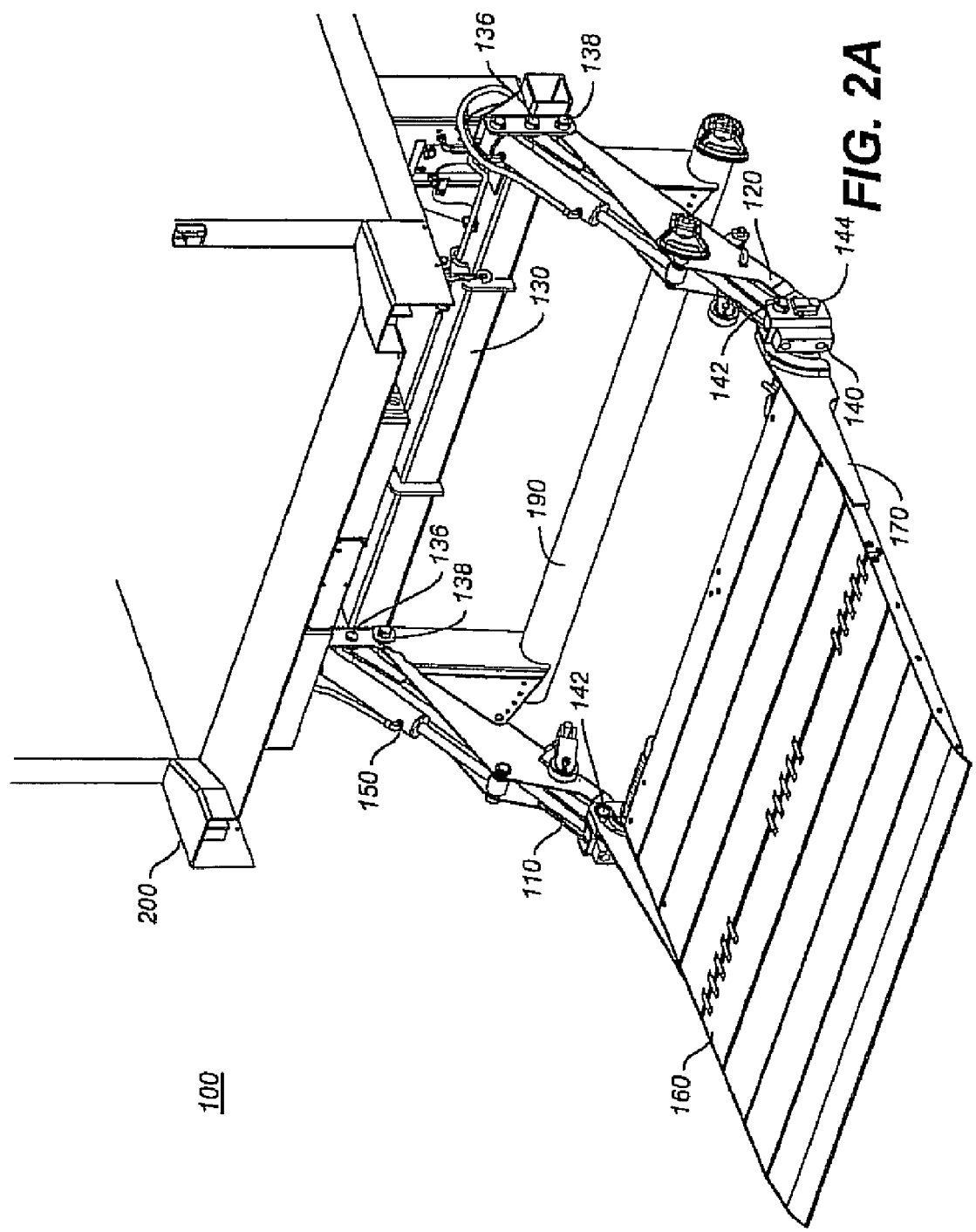

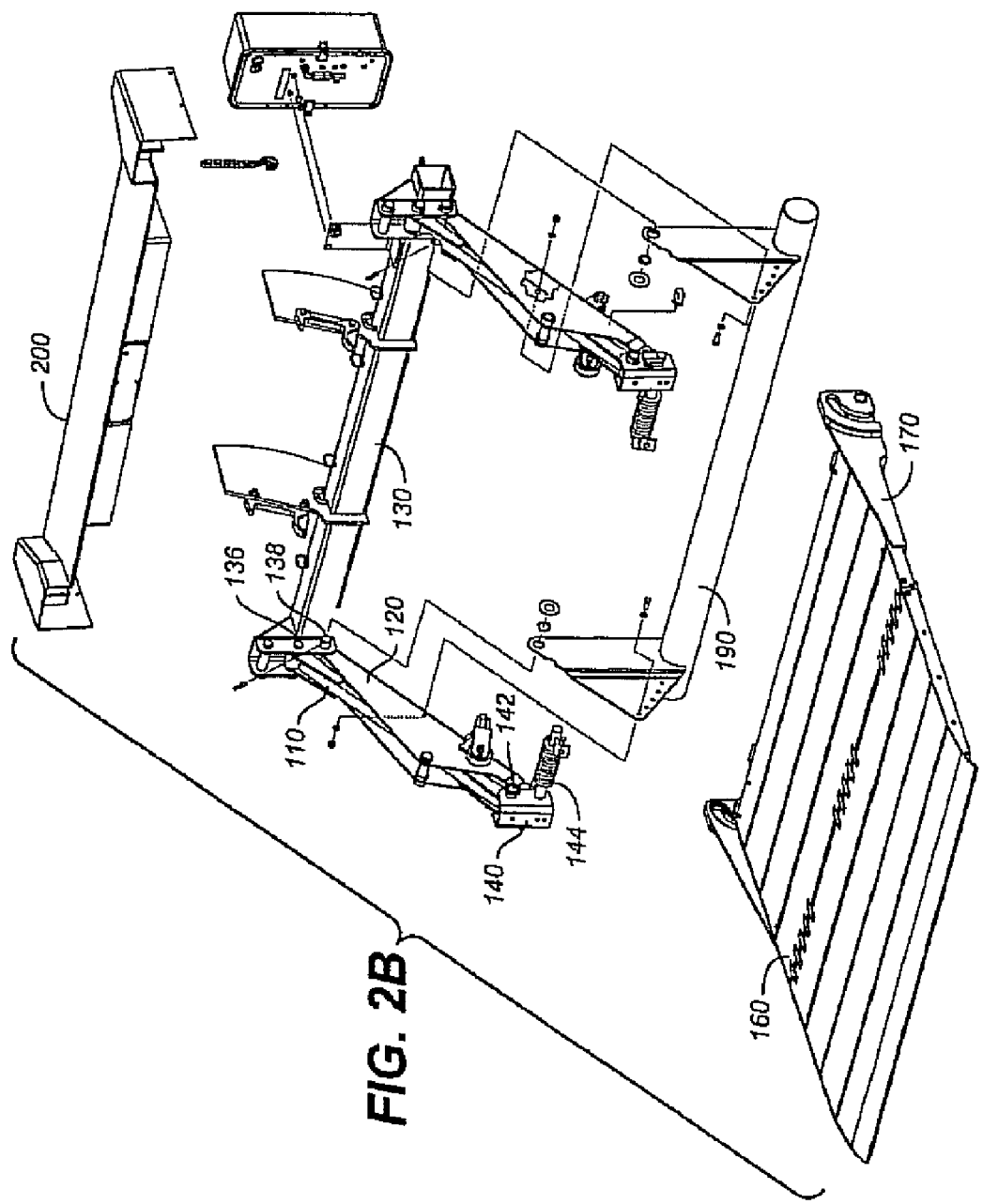

APPARATUS FOR LEVEL RIDE LIFT

CROSS REFERENCE TO RELATED APPLICATIONS

This application is a Continuation of U.S. patent application Ser. No. 11/100,805 filed on Apr. 6, 2005, now issued U.S. Pat. No. 7,556,467.

BACKGROUND

1. Field of the Invention

The present invention relates generally to load lifting and lowering devices and, more particularly, to a lift having a platform which is able to rest on or near the ground and remain substantially level during raising and lowering.

2. State of the Art

A common type of load elevator or lift comprises a substantially rectangular platform connected at one edge to the swingable ends of a laterally spaced apart pair of linkage systems. The other ends of the linkage systems are pivotally connected to a support such as the chassis of a vehicle or a loading dock. A power means, usually hydraulic, is interconnected to the pair of linkage systems for moving the platform between ground level and that of the truck or dock or the like. Each of the linkage systems comprises first and second lateral links in the form of an upper arm and a lower arm. The swingable ends of the linkage systems comprise a first vertical link between the upper and lower arms in the form of a shackle against which the weight of the platform and the load thereon are imposed. The other ends of the linkage systems comprise a second vertical link between the upper and lower arms in the form of the support to which the linkage systems are pivotally connected. In this manner, the upper and lower arms, the shackle and the support define a substantially parallelogram-shaped arrangement for each of the linkage systems.

A problem typically encountered with the above-described linkage systems is that they do not maintain a perfect parallelogram arrangement when moving the platform between a raised and lowered position. Rather, the first vertical link is slightly rotated during translation such that the platform describes an arc as it is being raised or lowered. When located at or near ground level, this causes the outer edge of the platform to be tilted or ramped towards the ground. This may not be suitable for some loads, such as those resting on wheels or other mechanisms allowing for lateral load movement.

One approach to addressing this problem has been to lower the platform a first distance wherein the linkage systems are maintained in the parallelogram arrangement, i.e. without substantially rotating the first vertical link, and then using additional mechanisms to move the platform a second distance into contact with the ground. This two-step translation method enables the platform to have a substantially level orientation through most of its lifting range, but requires a complex lift assembly that is more difficult to manufacture and maintain. Moreover, the platform may still have to be slightly tilted when translating through the second distance in order to reach the ground.

What is needed is a lift that has a platform with a substantially level ride through its entire lifting range and that does not require the use of complex mechanisms for lowering the platform to a location on or near the ground.

BRIEF SUMMARY OF THE INVENTION

The present invention overcomes the above-described problems with prior art lifts by providing a method and apparatus for a lift with a platform which is able to rest on or near the ground and remain substantially level during raising and lowering. The present invention accomplishes this by use of a novel linkage system arrangement having an upper arm and a lower arm coupled between a support frame and a shackle. The shackle is attached to a platform support that holds a lift platform in a level position while touching or very nearly touching the ground.

In one embodiment according to the present invention, an actuator is positioned above the upper arm and the lower arm of the linkage system, and the lower arm has sides forming a hollow configuration for surrounding the lower arm and attaching to the actuator. Alternatively, the actuator may be positioned below, between or to the side of the upper arm and the lower arm.

In another embodiment according to the present invention, an active opener arm is connected to the linkage system and assists in stowing and unstowing the lift platform.

In yet another embodiment according to the present invention, an extension plate cooperates with the lift platform for loading and unloading. The extension plate may have hinged sections, and may also have a removable center section for receiving locking rods.

Other and further features and advantages will be apparent from the following detailed description of the present invention when read in conjunction with the accompanying drawings. It should be understood that the embodiments described are provided for illustrative and exemplary purposes only, and that variations to, and combinations of, the several elements and features thereof are contemplated as being within the scope of the invention.

BRIEF DESCRIPTION OF THE SEVERAL VIEWS OF THE DRAWINGS

In the drawings, which illustrate what is currently considered to be the best mode for carrying out the invention:

FIGS. 2A-2B show one embodiment of a lift in accordance with the present invention.

DETAILED DESCRIPTION OF THE INVENTION

Figure 1A:
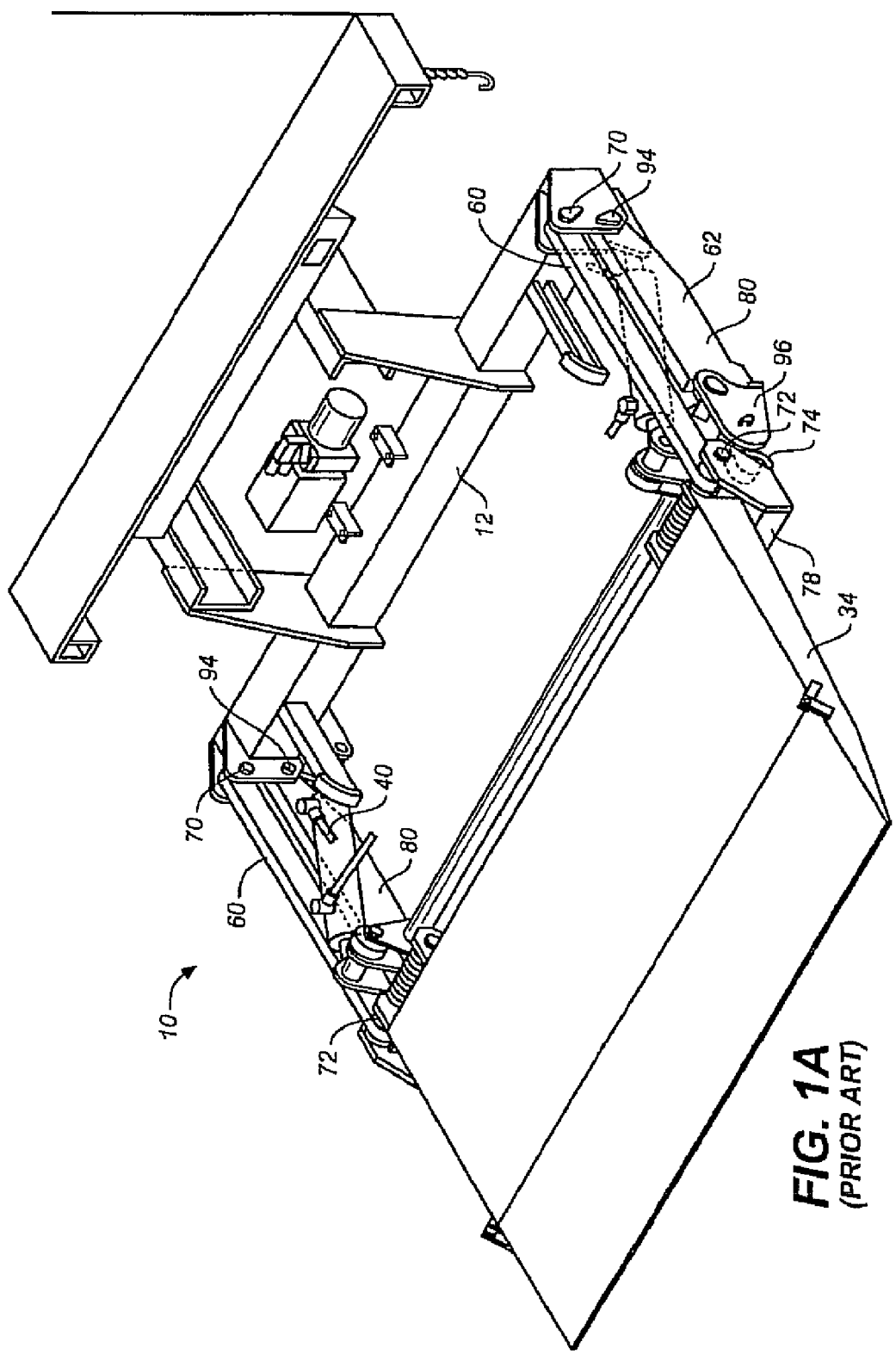
FIGS. 1A-1C show a prior art lift which tilts or ramps the outboard edge of the platform to the ground.
Figure 1B:
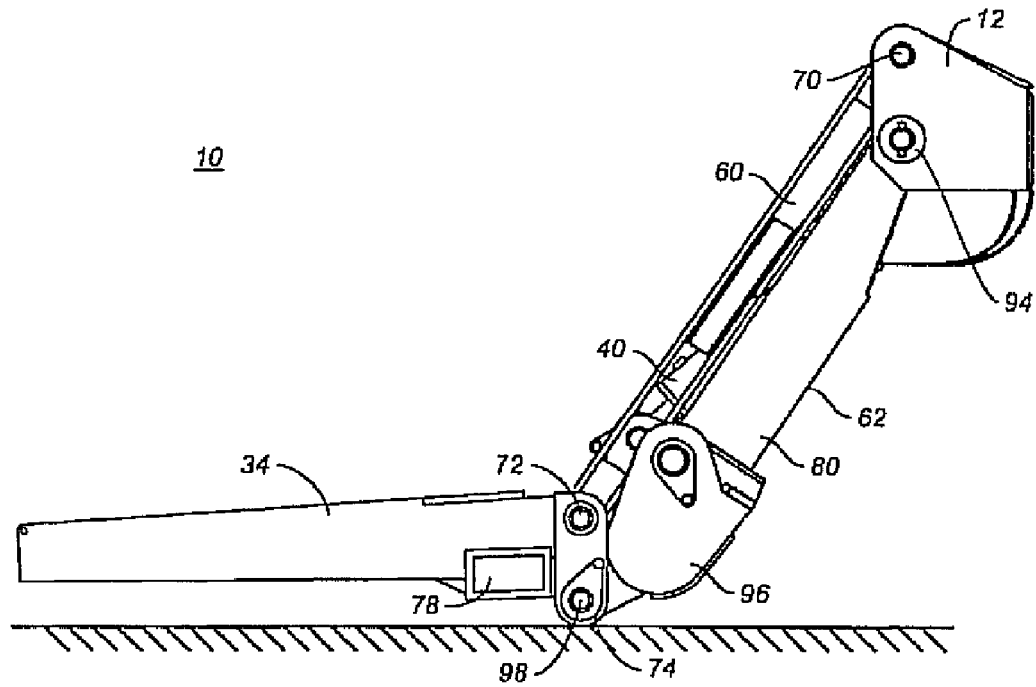

FIGS. 1A and 1B show a prior art lift 10 which tilts or ramps its platform 34 to the ground. Lift 10 includes an upper arm 60 and a segmented lower arm 62. One end of upper arm 60 is rotatably coupled to a main frame 12 by a first upper pin 70, while the swingable end of upper arm 60 is coupled to a shackle 74 by a second upper pin 72. The segmented lower arm 62 includes a member 80 rotatably coupled to a plate assembly 96. Member 80 is rotatably coupled to main frame 12 by a first lower pin 94, and plate assembly 96 is coupled to shackle 74 by a second lower pin 98. Lift 10 also includes a cylinder 40 coupled to main frame 12 and to the inside of plate assembly 96. Platform 34 is rotatably coupled to shackle 74 by second upper pin 72 and includes a support member 78 which rests against shackle 74 to support platform 34 from below.

Figure 1C:
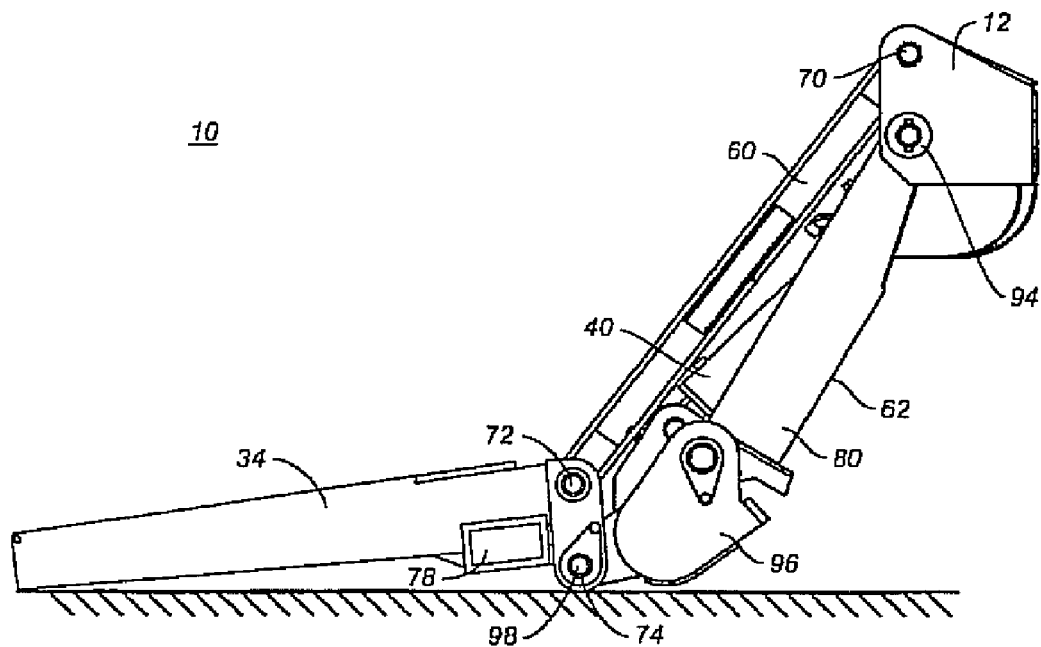

FIG. 1B shows a side view of lift 10 in a lowered position. In this position, plate assembly 96 and/or shackle 74 contacts the ground, and platform 34 is still substantially level. Platform 34 is supported from below by support member 78, which is in contact with the outboard face of shackle 74. Cylinder 40 is then made to become shorter, causing member 80 and plate assembly 96 to rotate with respect to each other and "break" and draw in lower pin 98 of shackle 74. This has the effect of tilting shackle 74 and thus platform 34. FIG. 1C shows a side view of lift 10 with platform 34 in a tilted or ramped position, after cylinder 40 has been made to become shorter. As can be seen in FIGS. 1A-1C, platform 34 cannot be maintained in a level orientation while contacting the ground.

FIGS. 2A-2B show one embodiment of a lift 100 in accordance with the present invention, in assembled and partially exploded views. Lift 100 includes an upper arm 110 and a lower arm 120. Upper arm 110 is rotatably coupled to a frame 130 by a first upper pin 136, while the swingable end of upper arm 110 is coupled to a shackle 140 by a second upper pin 142. Lower arm 120 is coupled to frame 130 by a first lower pin 138 and to shackle 140 by a second lower pin 144. The points where upper arm 110 and lower arm 120 couple to frame 130 and shackle 140 may substantially form a linkage system defining the sides of a parallelogram. Lift 100 also includes an actuator 150, for example a hydraulic cylinder, coupled to frame 130 and lower arm 120.

Lift 100 includes a platform support 170. Platform support 170 is positioned adjacent to shackle 140 and rotatably fixed with respect to the swingable end of lower arm 120 by second lower pin 144. A platform 160 is coupled to and rests on platform support 170. FIGS. 2A-2B show that an extension plate 200 may be installed to cooperate platform support 170 of lift 100, as described in further detail with respect to FIGS. 6A-6D, and lift 100 may also include an underride 190, described in further detail with respect to FIGS. 7A-7B. Steps (not shown) may also be attached to underride 190, extension plate 200, or other parts of lift 100, as known in the art.

Figure 3A:
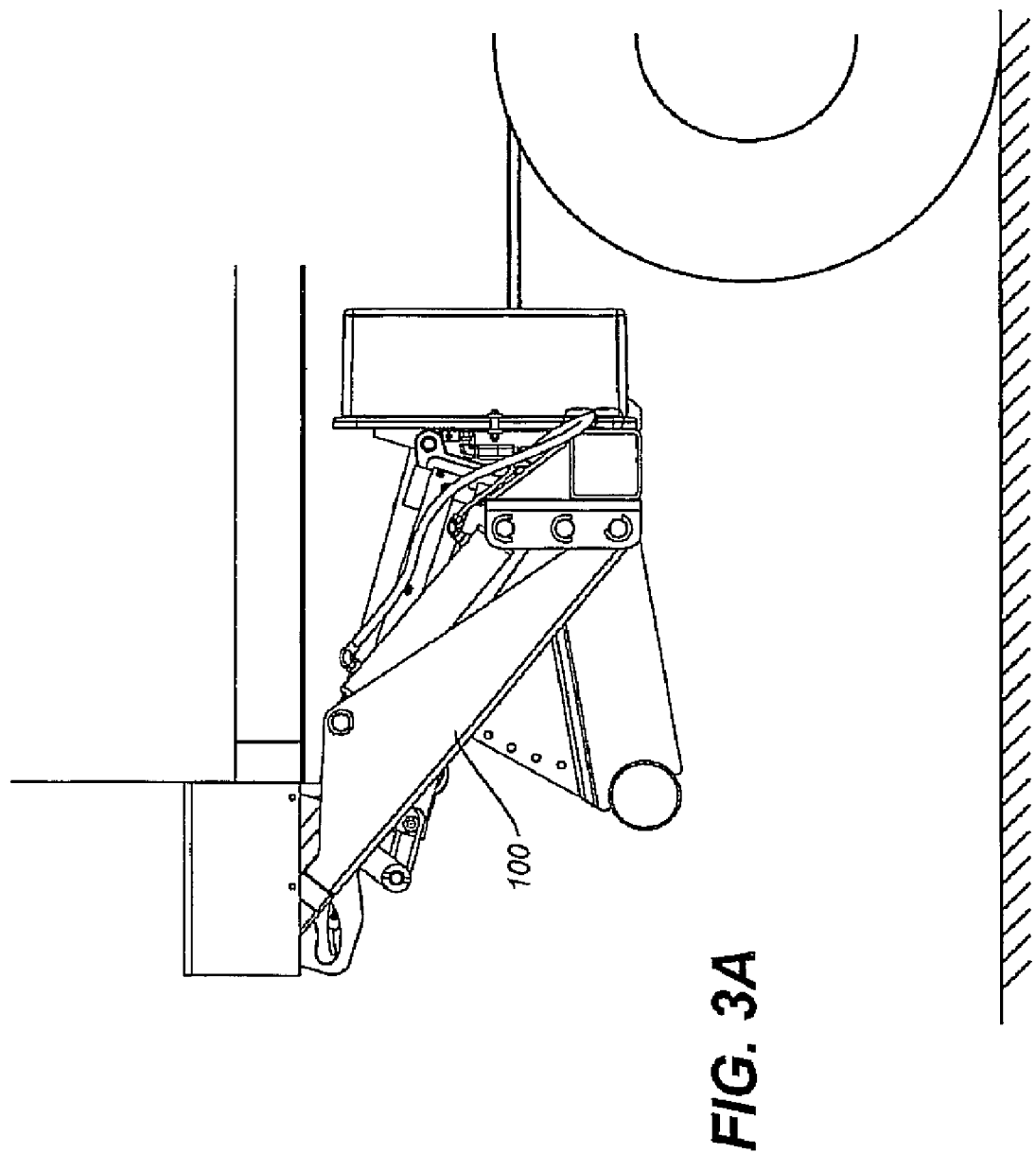
FIGS. 3A-3F show multiple views of one embodiment of a lift in accordance with the present invention with the platform in a fully stowed, partially stowed, partially unfolded, fully unfolded, and bed level positions.
Figure 3B:
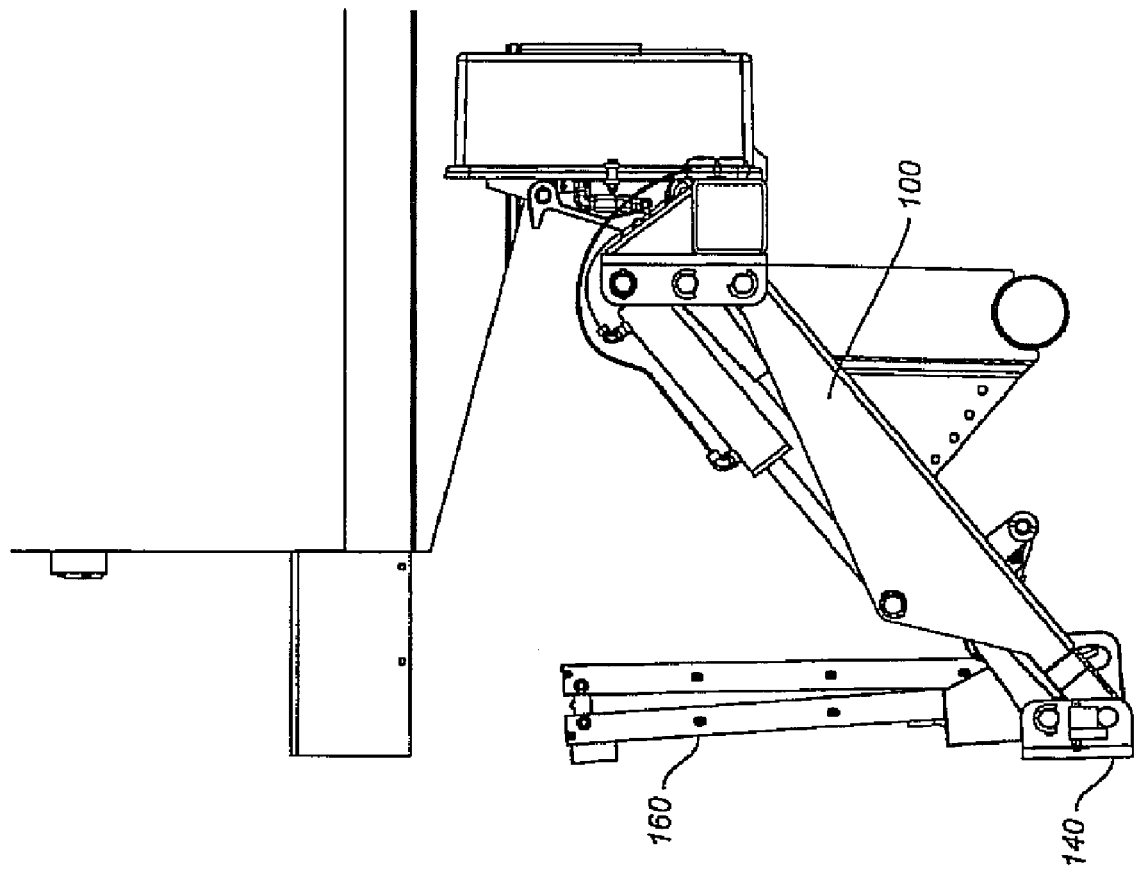
Figure 3C:
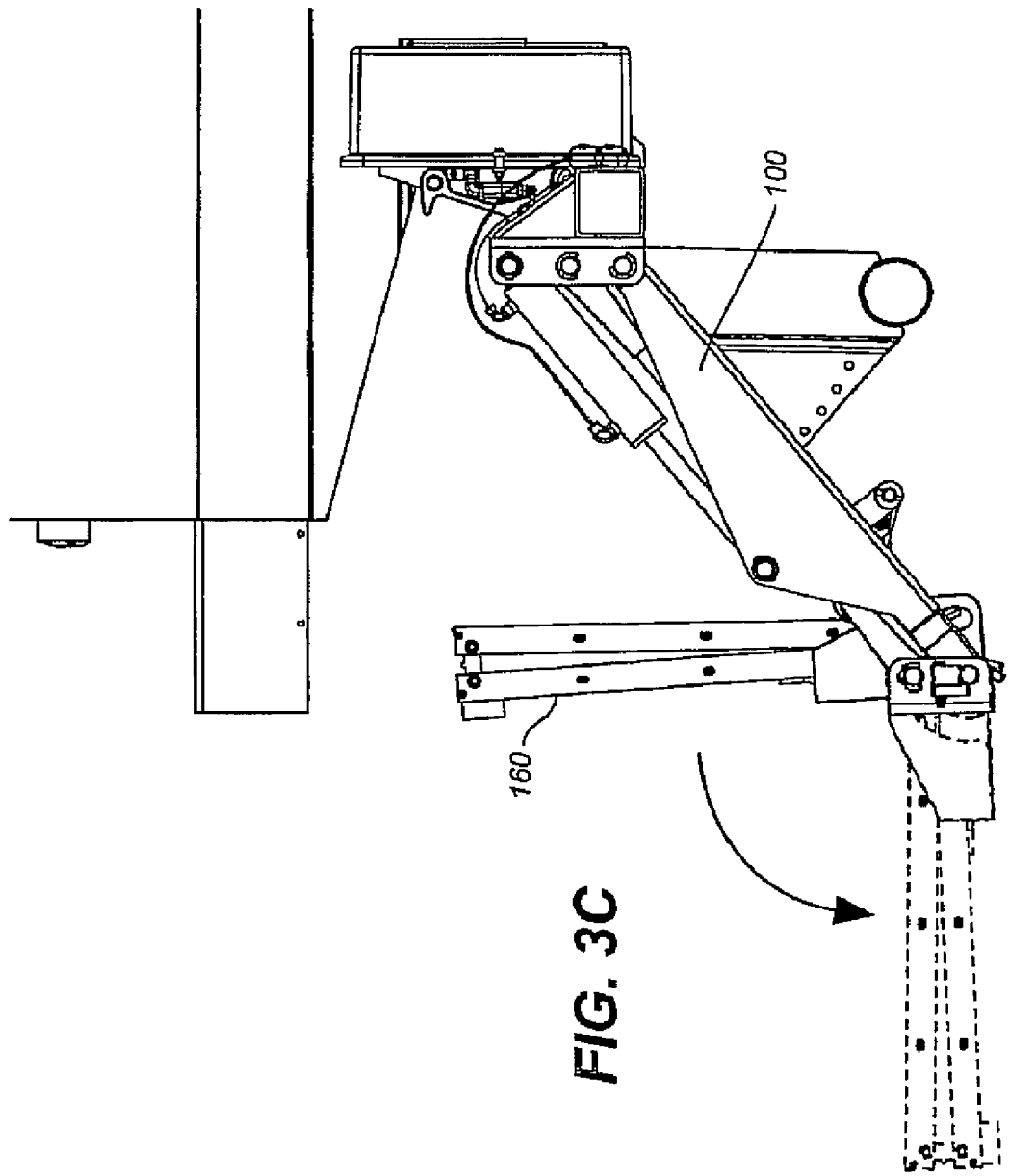
Figure 3D:
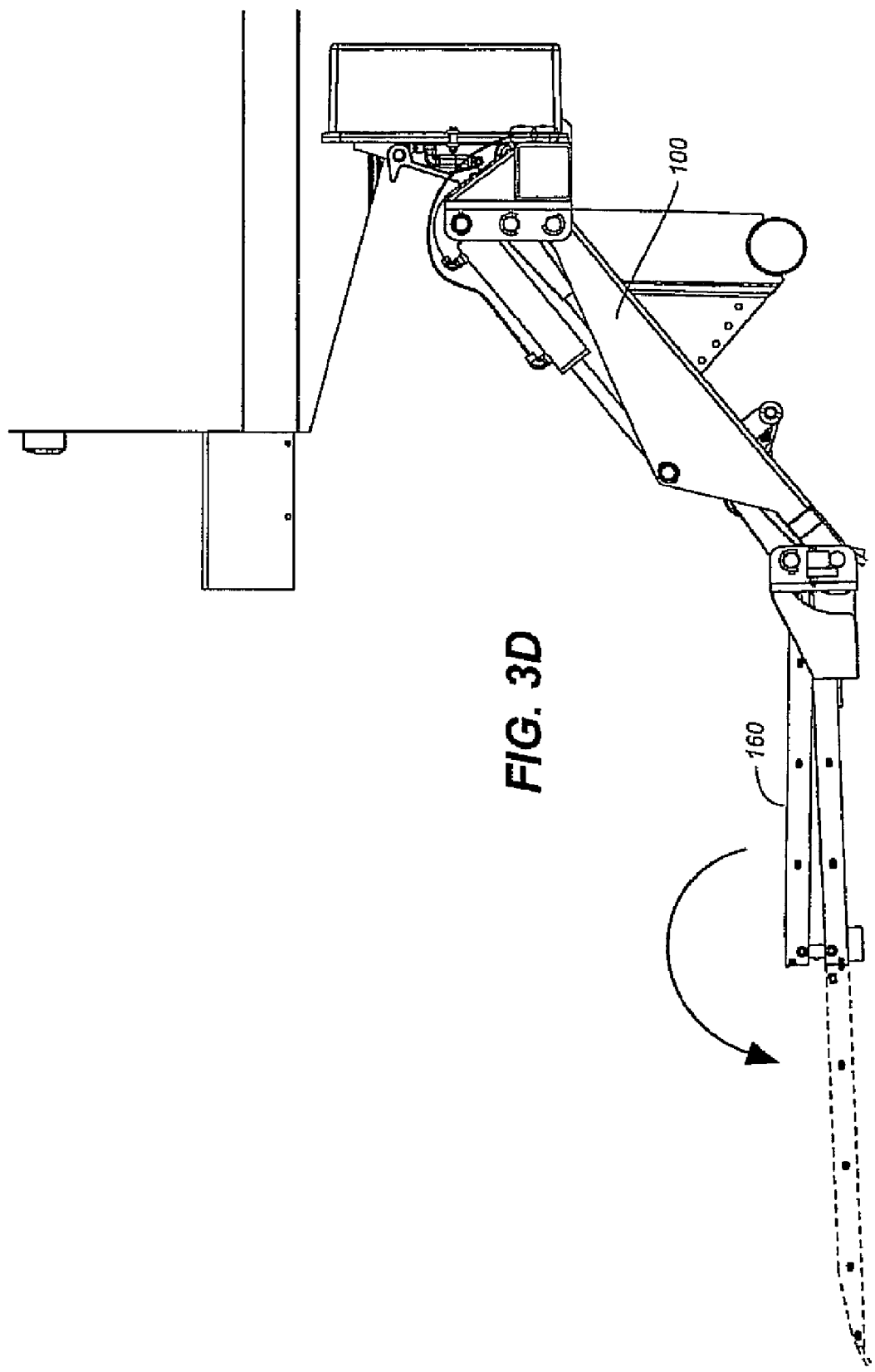
Figure 3E:
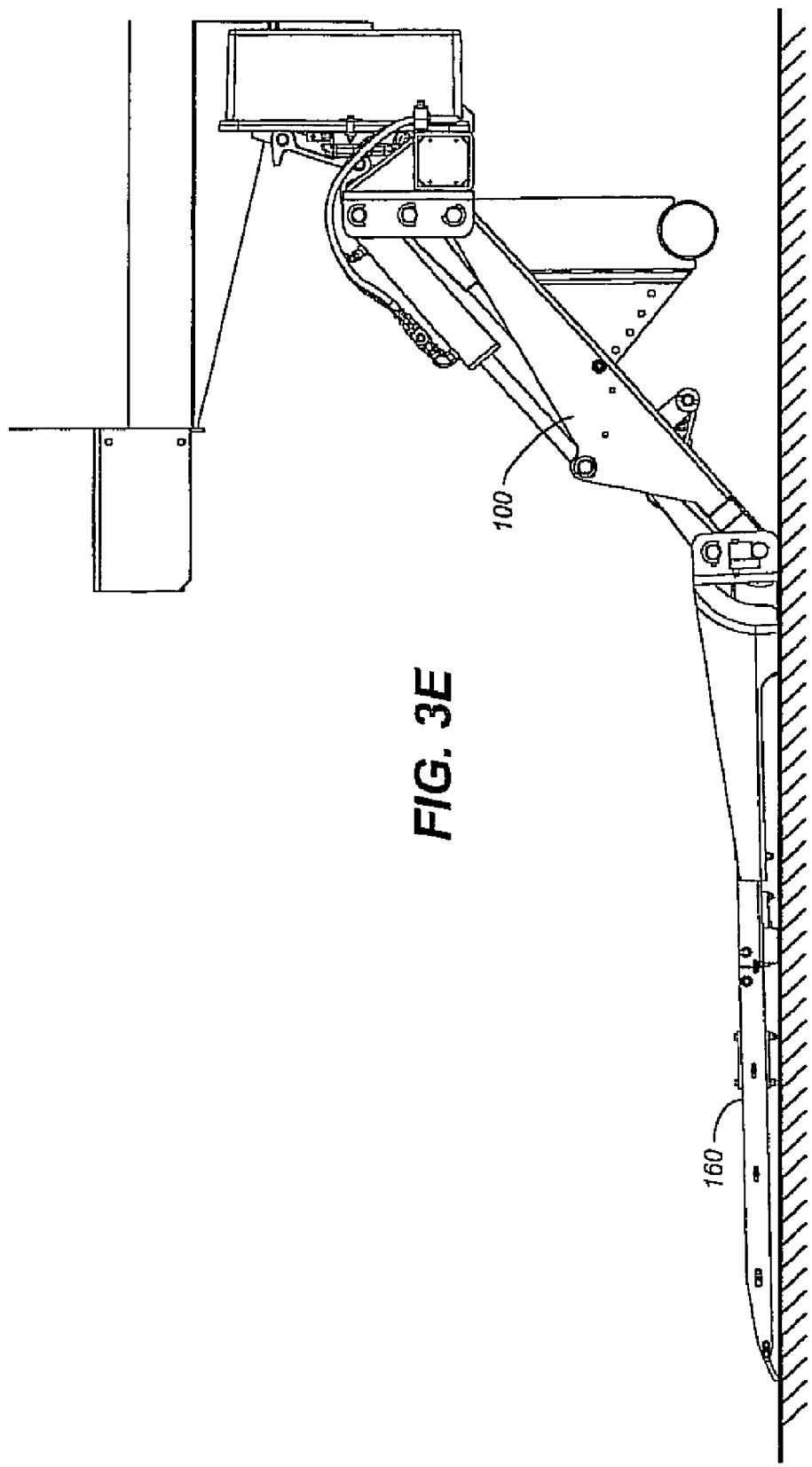
Figure 3F:
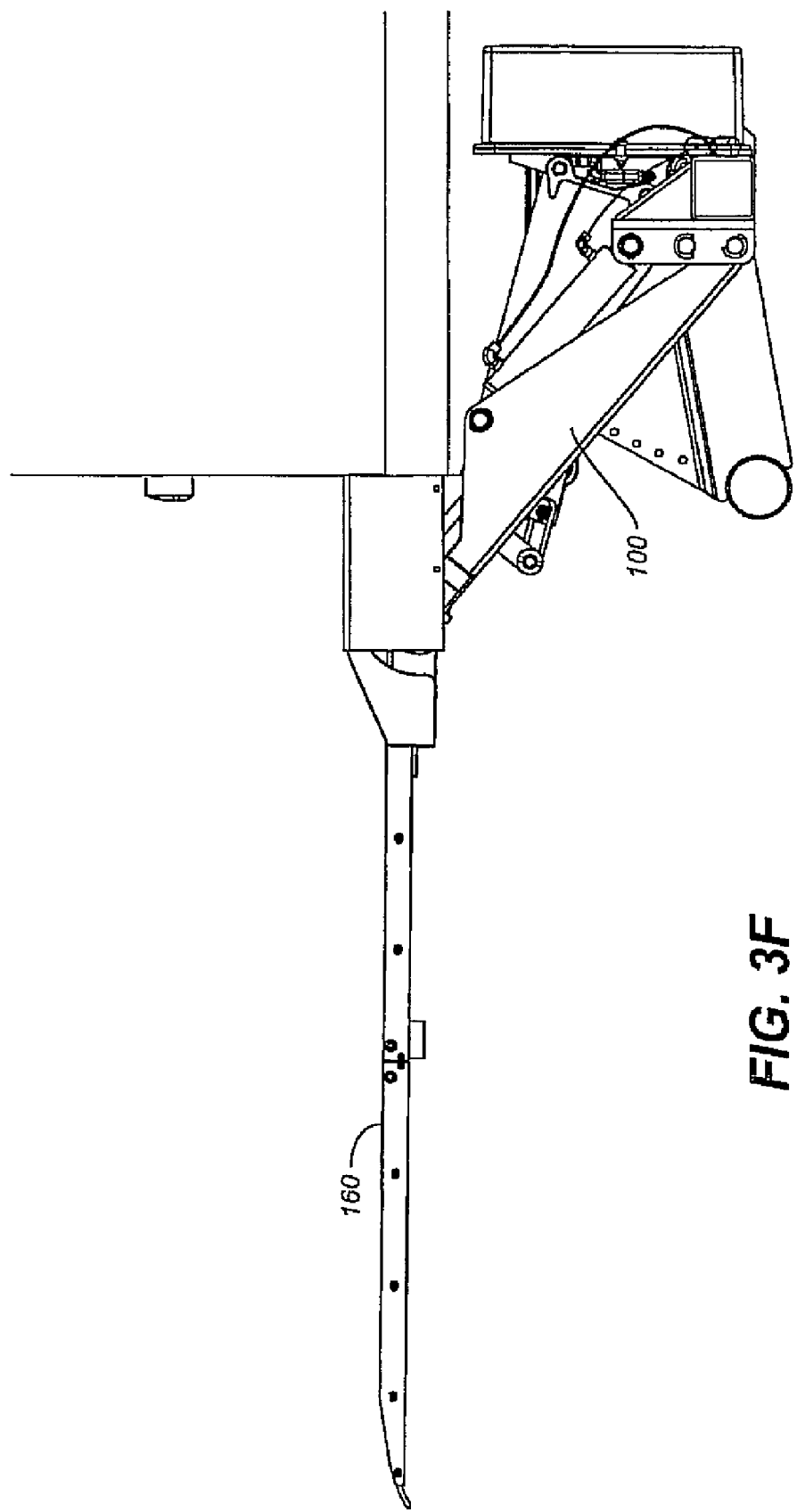

FIGS. 3A-3F show side views of lift 100 in various stages of moving from a raised to a lowered position. FIG. 3A shows lift 100 in a fully stowed stage, with upper arm 110 and lower arm 120 in a raised position. FIG. 3B shows lift 100 in a partially stowed stage, with upper arm 110 and lower arm 120 in a lowered position. Shackle 140 contacts the ground or is very close to the ground. Platform 160 is forced partially outward from the stowed position by an active opener arm 125, which assists in the stowing and unstowing of platform 160, as described in further detail with respect to FIGS. 5C-5D. FIG. 3C shows lift 100 with platform 160 being partially unfolded. FIG. 3D shows lift 100 with platform 160 being further unfolded. FIG. 3E shows lift 100 in the ground position, with platform 160 fully unfolded. Platform support 170 and/or shackle 140 contacts the ground. Platform 160 is substantially level, and is touching or very nearly touching the ground. FIG. 3F shows lift 100 subsequently raised with platform 160 at the vehicle bed or loading dock level position.

Figure 4A:
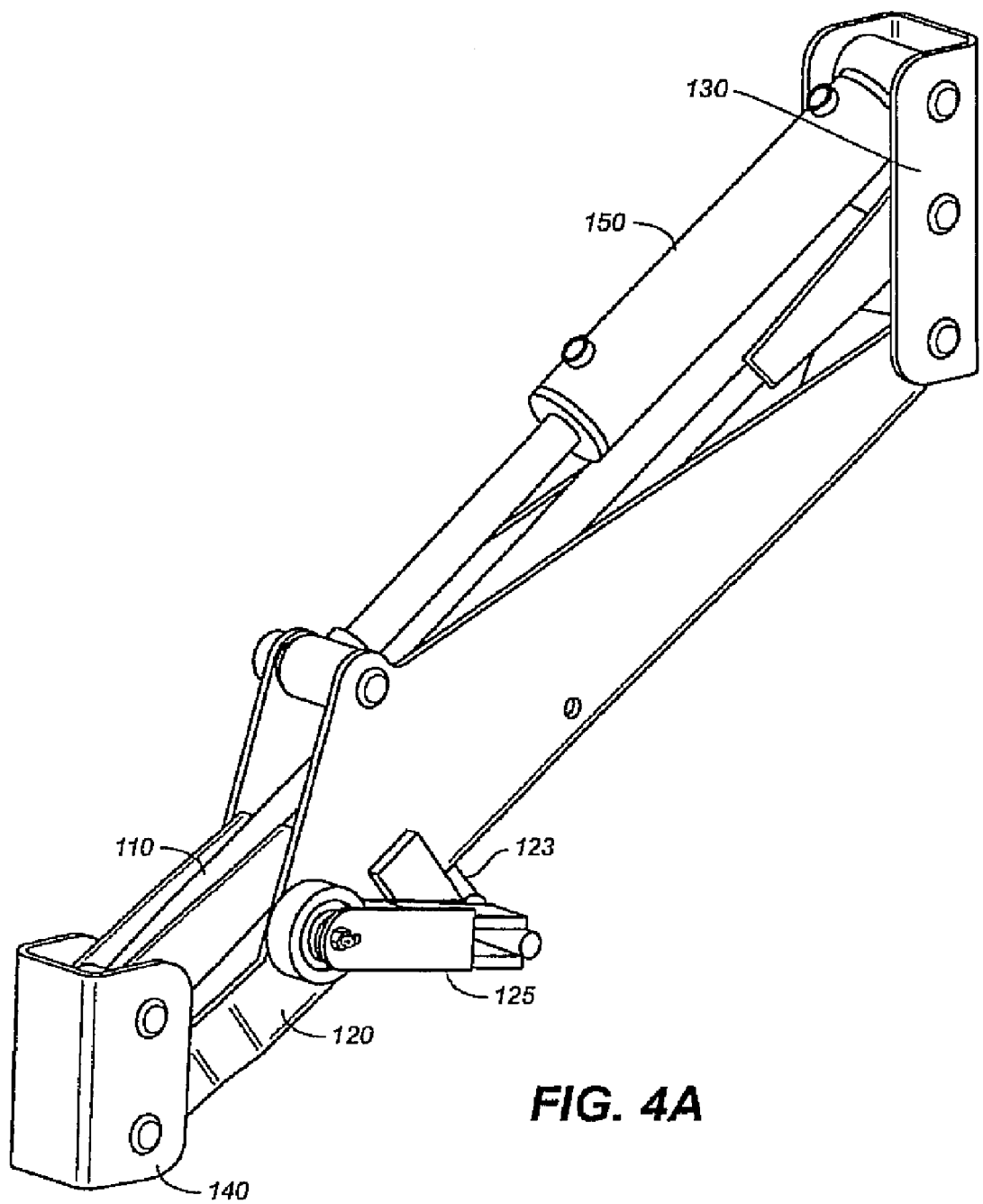
FIGS. 4A-4B show one embodiment of an upper arm and a lower arm in accordance with the present invention.
Figure 4B:
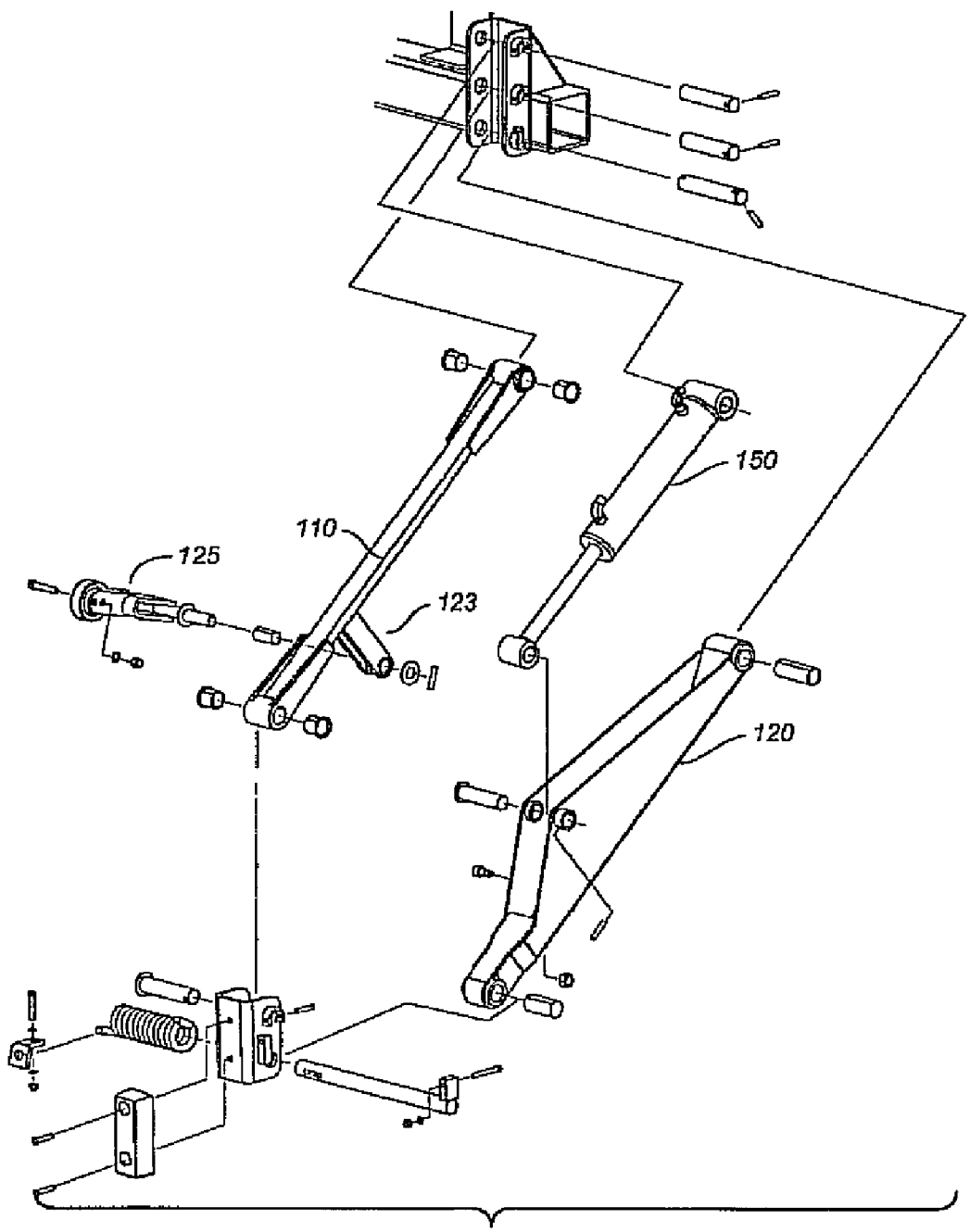

FIGS. 4A-4B show one embodiment of upper arm 110 and lower arm 120 in accordance with the present invention. Actuator 150 is positioned above both upper arm 110 and lower arm 120 and is coupled to frame 130 and lower arm 120.

In the illustrated embodiment, lower arm 120 has a hollow configuration which at least partially encloses or envelopes upper arm 110 and allows actuator 150 to be coupled to the sides of lower arm 120. FIG. 4A also shows that lower arm 120 may include a channel which allows an extension 123 to be coupled to upper arm 110 and to pass through the channel for coupling to active opener arm 125.

In an alternative embodiment, lower arm 120 may not have continuous sides forming a hollow configuration, but may instead have discrete extensions which reach around upper arm 110 and allow actuator 150 to be coupled to lower arm 120. While not a requirement of the present invention, FIGS. 4A-4B show that actuator 150 is preferably positioned in substantially the same vertical plane as upper arm 110 and lower arm 120. Configuring upper arm 110, lower arm 120, and actuator 150 to rotate in substantially the same vertical plane reduces binding during operation.

Other arrangements for positioning actuator 150 with respect to upper arm 110 and lower arm 120 are also contemplated as being within the scope of the present invention. It is possible, for example, that actuator 150 may be positioned below upper arm 110 and lower arm 120, with actuator 150 coupled to frame 130 and upper arm 110. It is also possible that actuator 150 may be positioned between upper arm 110 and lower arm 120, with actuator 150 coupled to frame 130 and upper arm 110 and/or lower arm 120.

Figure 5A:
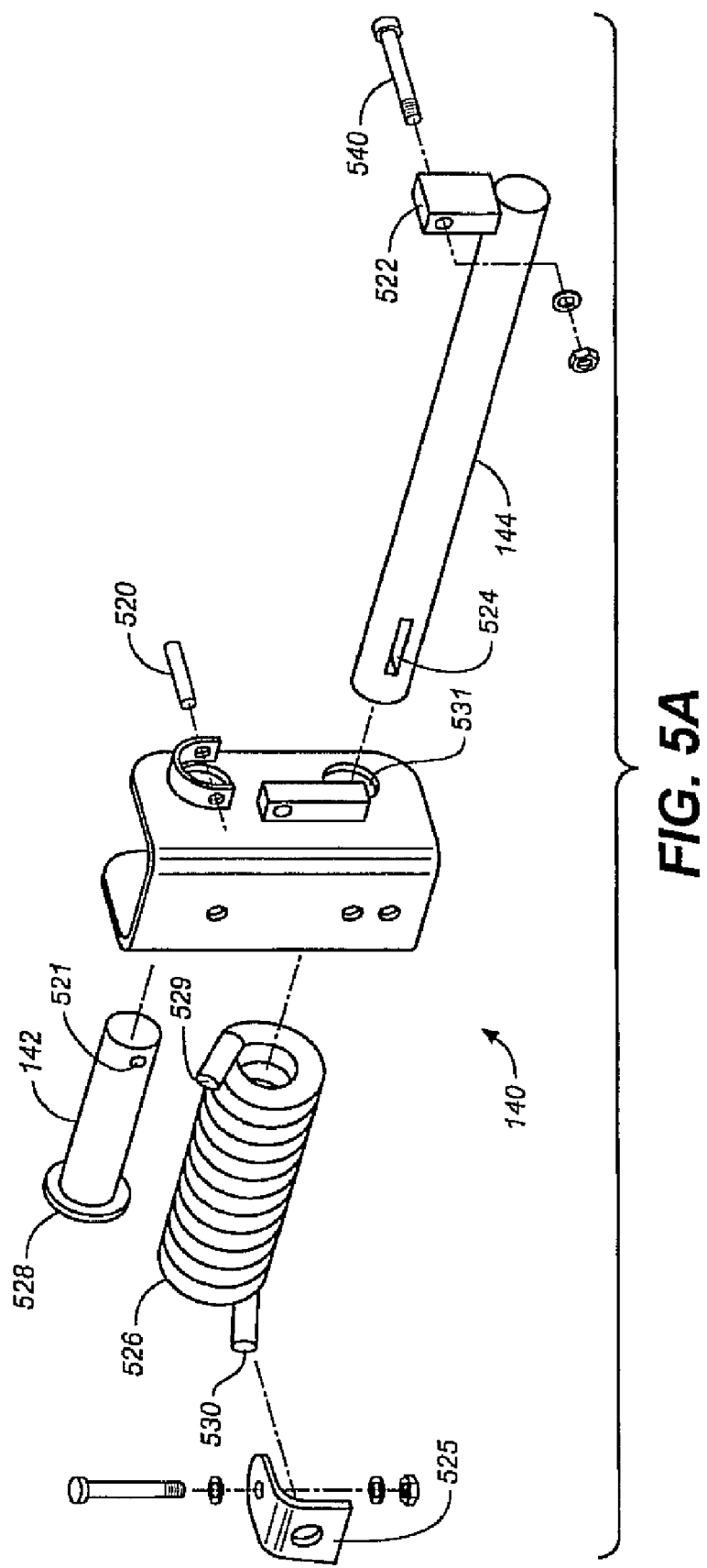
FIGS. 5A-5D show one embodiment of a shackle and platform support in accordance with the present invention.

FIG. 5A shows one embodiment of a shackle 140 in accordance with the present invention. Shackle 140 is coupled to upper arm 110 and lower arm 120 by second upper pin 142 and a second lower pin 144, respectively. Second upper pin 142 may have a cap or head 528 on one end, and a slot 521 on the other end for receiving a fastener 520. First lower pin 144 has a stop 522 on one end and a slot 524 on the other end. Second lower pin 144 passes through a torsion spring 526, which includes an outer leg 529 and an inner leg 530. Torsion spring 526 is coupled to second lower pin 144 by a spring bracket 525 that mates with inner leg 530 and slot 524, such that inner leg 530 is fixed in place to prevent torsion spring 526 from freely rotating about second lower pin 144. Second lower pin 144 is prevented from rotating by stop 531 on shackle 140 which is mated with stop 522 on lower pin 144 with a fastener 540. Shackle 140 may also include a dock bumper 180 (FIGS. 5C and 5D).

Figure 5B:
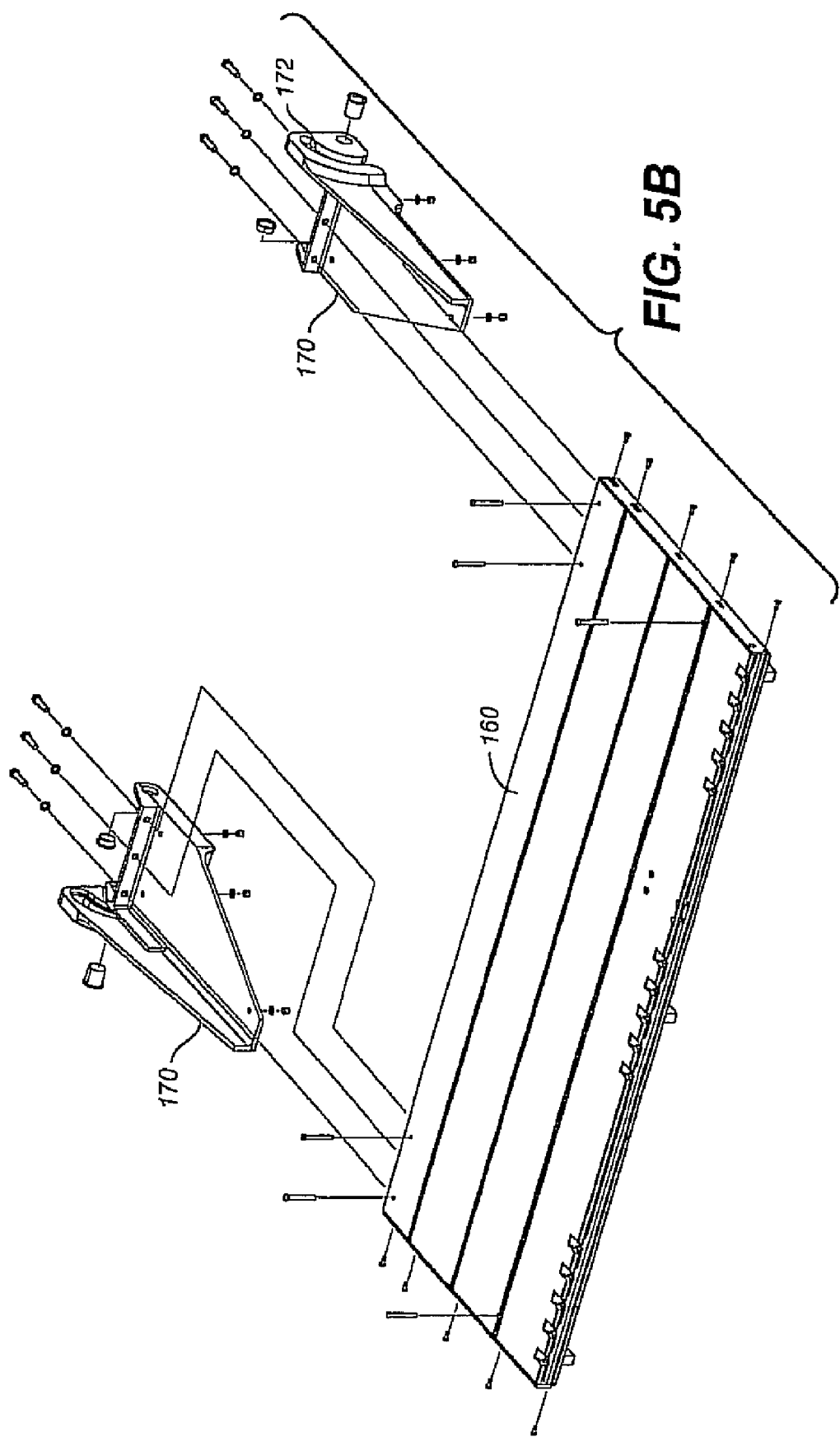
Figure 5C:
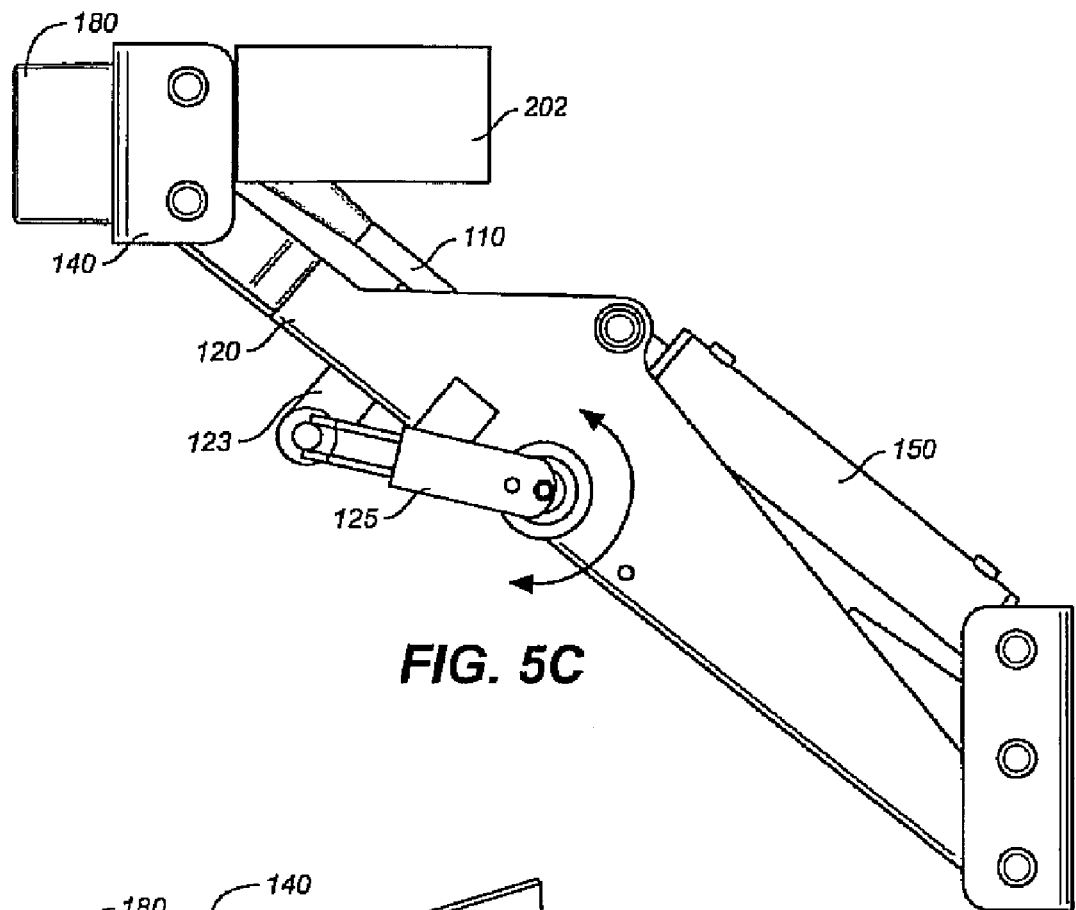
Figure 5D:
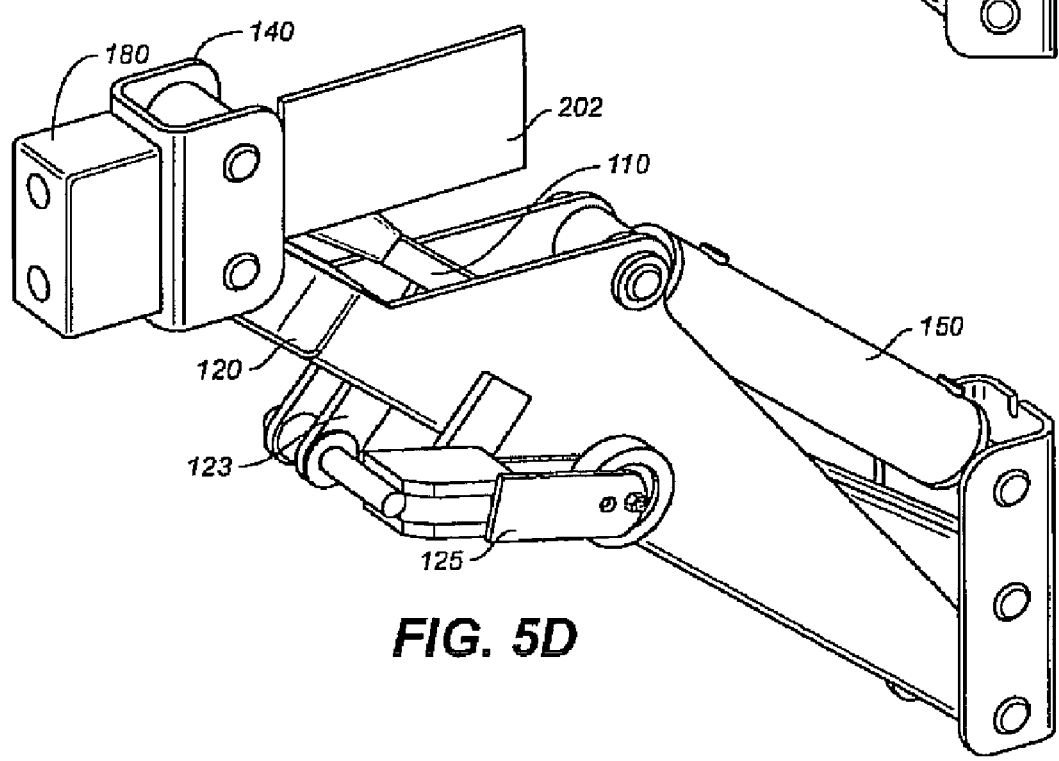

FIG. 5B shows one embodiment of a platform support 170 in accordance with the present invention. Platform support 170 is configured to be coupled to lower pin 144 of shackle 140, and is capable of rotating about lower pin 144. As platform 160 is unstowed, platform 160 rotates about lower pin 144 and a channel 172 in platform support 170 slidably engages upper pin 142. When platform 160 is unstowed to a horizontal position, upper pin 142 stops at the end of channel 172 and allows platform support 170 to hold platform 160 in a substantially level position. Channel 172 may be suitably configured to mate with cap or head 528 of upper pin 142. Platform support 170 is thus supported from above by upper pin 142 when unstowed. This allows the bottom of platform 160 when unstowed to be at substantially the same level as or lower than the bottom of shackle 140.

When lift 100 is in the lowered position, platform 160 is capable of resting on or near the ground. When lift 100 is in the vehicle bed or loading dock level position, platform support 170 may have raised sides 214 (FIGS. 6A-6D) which cooperate with extension plate 200 to provide a guide for loading and unloading on platform 160. When lift 100 is in the stowed position shown in FIG. 3A, the stowed platform 160 has a lower profile because it is coupled to lower pin 144. This lower profile may reduce the required length of extension plate 200 needed to provide proper clearance to lift 100. When platform 160 is in the unstowed position shown in FIGS. 3D-3E, outer leg 529 of torsion spring 526 are biased against platform support 170 and help in stowing and unstowing of platform 160.

In other embodiments within the scope of the present invention, platform support 170 may include a tab or other structure in place of, or in addition to channel 172 that stops against upper pin 142 when platform 160 is unstowed. Shackle 140 may also include one or more structures for coupling of platform 160 and/or for engaging channel 172 or platform 160 itself. Platform support 170 and platform 160 may thus be supported by upper pin 142 or any part of shackle 140. While not required, it is preferred that platform 160 be supported from a location that is above or at substantially the same level as lower pin 144. Although shackle 140, platform 160, and platform support 170 are shown as separate elements in the embodiments described, any combination of these three elements may be formed as a single piece. In another embodiment, shackle 140 may also be taller or longer than illustrated and support platform 160 with a chain, cable or linkage attached between platform 160 and shackle 140, in addition to or in place of platform support 170.

FIGS. 5C-5D shows views of one embodiment of dock bumper 180, with extension plate 200 cut away to show detail. Dock bumper 180 may prevent damage to lift 100 when attached to a vehicle, for example, that is backed into a dock or other structure. Extension plate 200 includes a housing 202 to receive shackle 140, and shackle 140 is configured to press against the inside of housing 202 when lift 100 is in a stowed configuration, so as to transfer force from dock bumper 180 to extension plate 200 and minimize or prevent damage to other parts of lift 100 such as upper arm 110 and/or lower arm 120. Extension plate 200 in turn is configured to transfer force from shackle 140 to the vehicle. Mounting dock bumpers 180 on shackles 140 instead of extension plate 200 allows extension plate 200 to be designed with a greater useful width.

As shown in FIGS. 5C-5D, the linkage system may also include an active opener arm 125, which assists in the stowing and unstowing of platform 160. Active opener arm 125 is coupled to upper arm 110 by an extension 123. When lift 100 moves from a raised to a lowered position, translation of upper arm 110 and extension 123 causes active opener arm 125 to rotate and exert pressure against platform 160, forcing platform 160 outward towards its unstowed orientation. Likewise, when lift 100 moves from a lowered to a raised position, active opener arm 125 is caused to rotated in an opposite direction and lower platform 160 resting thereon towards a stowed orientation. Further details regarding the structure and function of such an active opener arm are described in copending U.S. application Ser. No. 10/789,909, the disclosure of which is incorporated herein by reference.

Figure 6A:
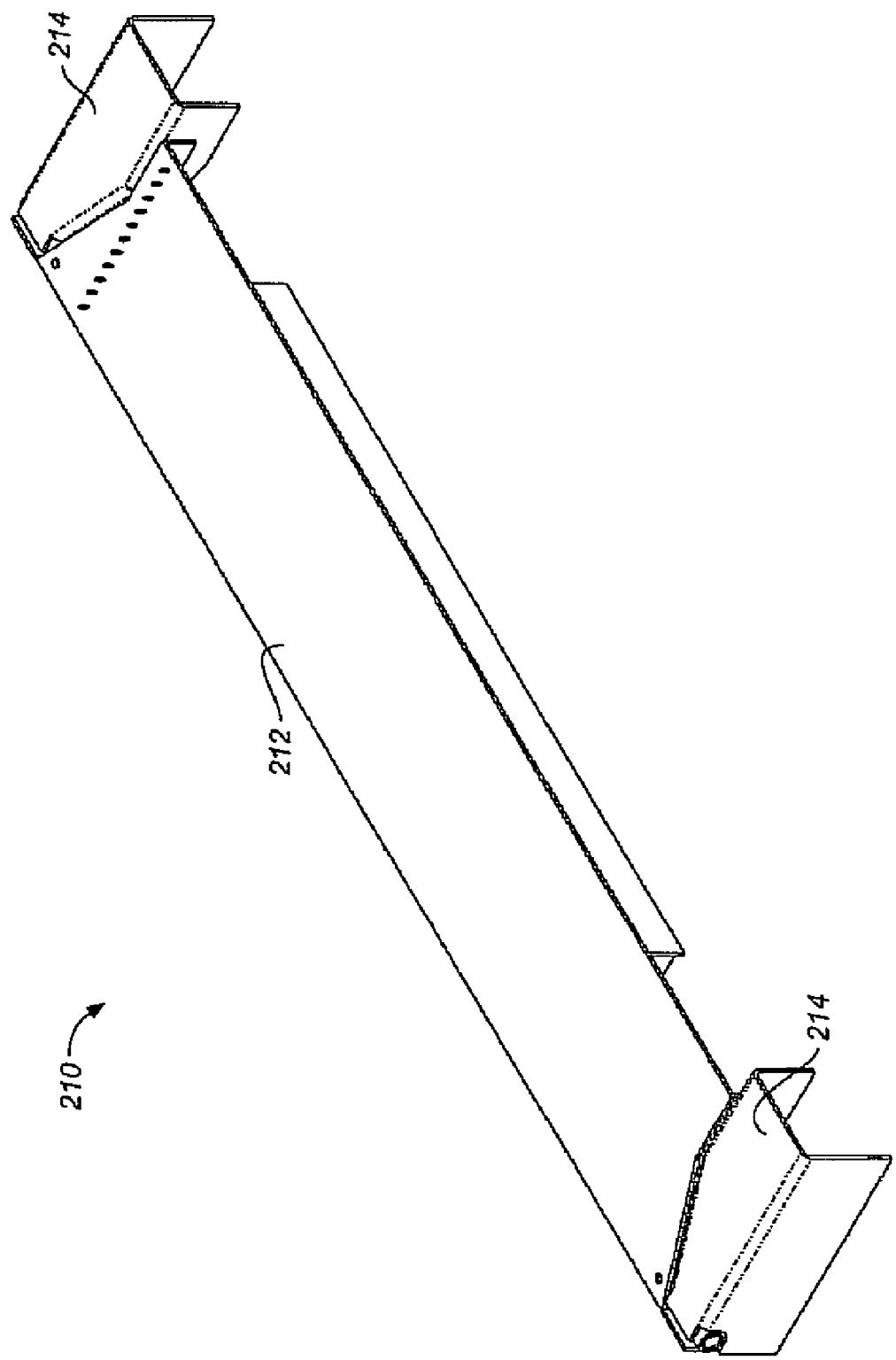
FIGS. 6A-6D show embodiments of extension plates in accordance with the present invention.
Figure 6B:
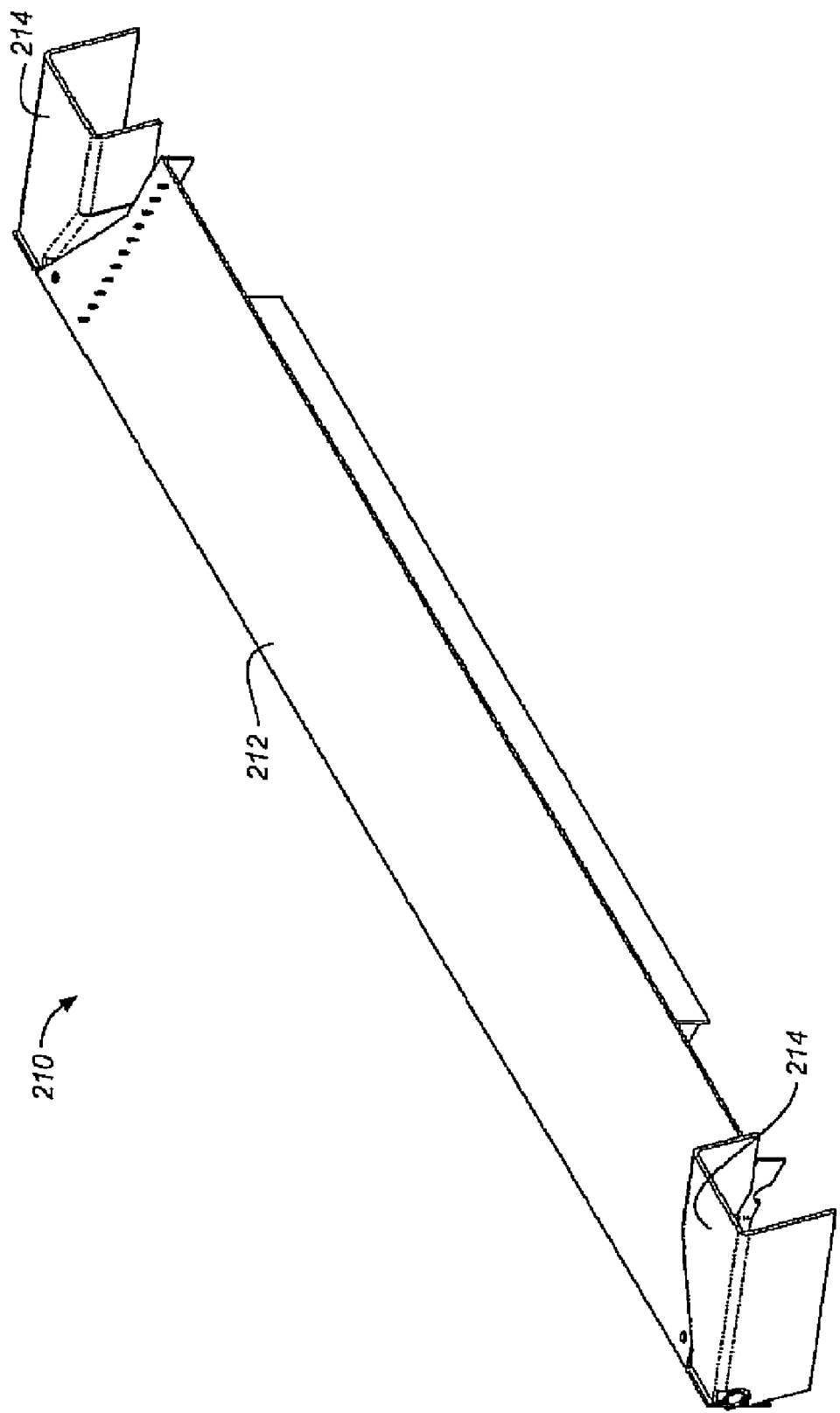

FIGS. 6A-6B shows one embodiment of an extension plate 210 in accordance with the present invention. Extension plate 210 includes a surface plate 212 with hinged sections 214. Hinged sections 214 are capable of lying flush with surface plate 212, as shown in FIG. 6A. FIG. 6B shows that when platform 160 of lift 100 is raised, shackles 140 will raise hinged sections 214, which may then cooperate with the raised sides of platform support 170 to provide a guide for loading and unloading. When platform 160 reaches the bed level position, platform 160 will be substantially coplanar with surface plate 212 and the vehicle bed or loading dock surface. When platform 160 is lowered, hinged sections 214 will drop back down.

Figure 6C:
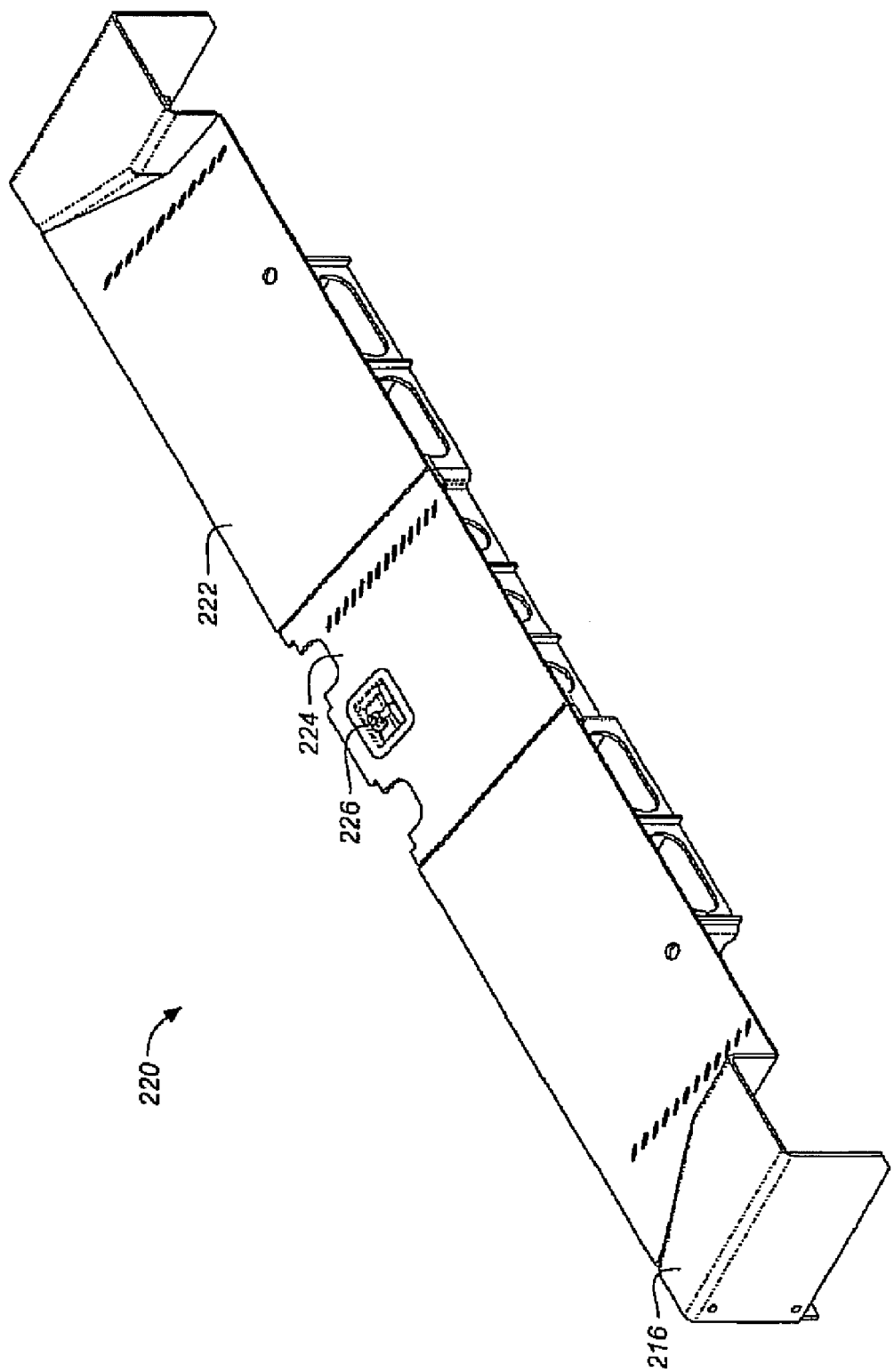
Figure 6D:
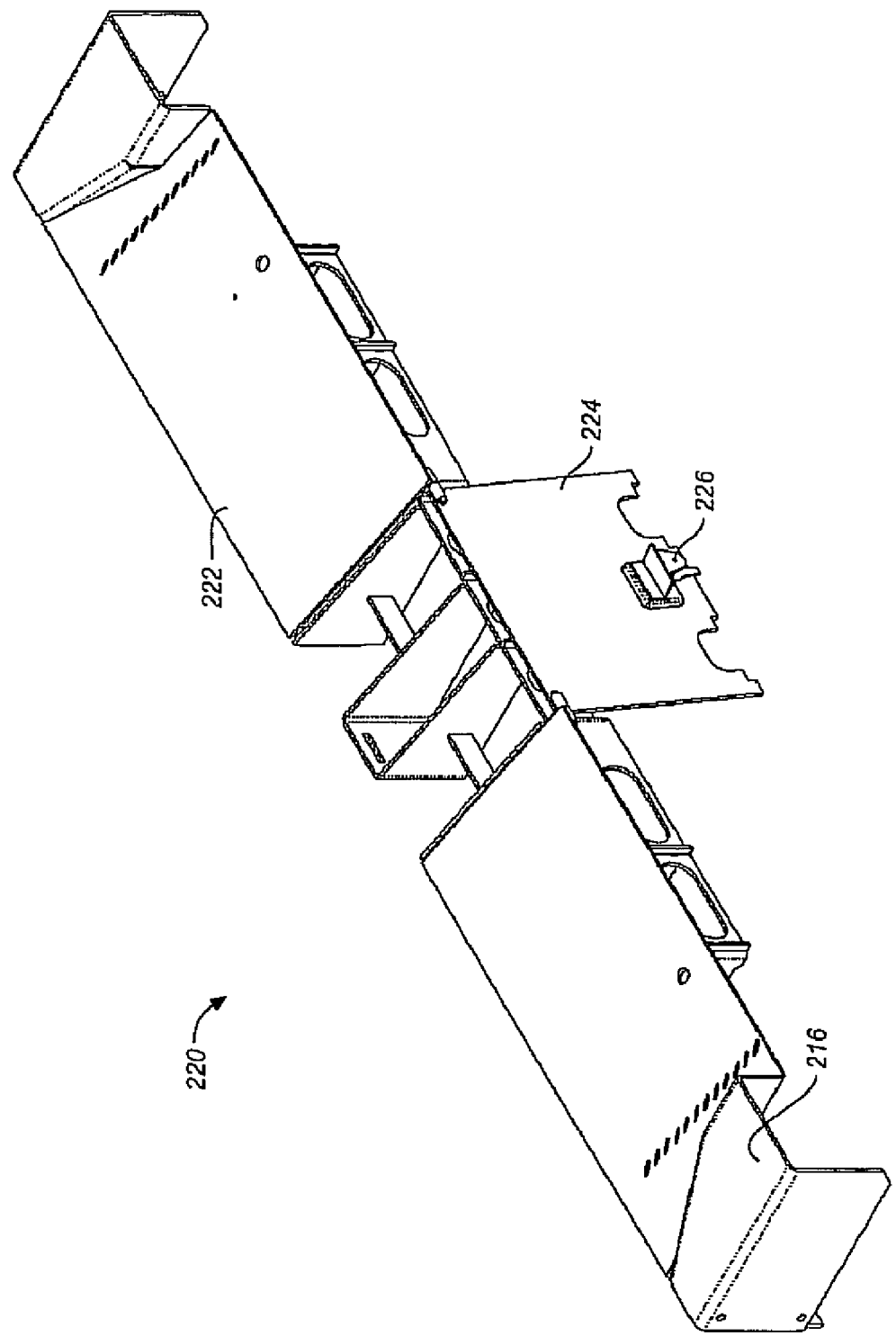

FIGS. 6C-6D show another embodiment of an extension plate 220 in accordance with the present invention that is configured to receive locking rods (not shown) that are known in the art to be found on conventional side-swinging doors. In order to accommodate such locking rods, extension plate 220 includes a surface plate 222 with a center section 224. FIG. 6C shows center section 224 lying flush with surface plate 222. FIG. 6D shows center section 224 moved to allow locking rods to be passed through extension plate 220. In the embodiment shown, center section 224 is hinged at the outboard edge of extension plate 220 and swings outward. Center section 224 may have a latch 226 to help keep it closed. In other embodiments, center section 224 may be removable, slidable, spring-loaded, hinged at the inboard edge of extension plate 220 and swing inward, or configured with any other suitable mechanism to provide clearance to locking rods. In yet another embodiment, surface plate 222 includes arcuate grooves or channels which provide clearance for the locking rods.

As seen in FIGS. 6C-6D, extension plate 220 also includes permanently raised sections 216, rather than the hinged sections 214 associated with extension plate 210. It is within the scope of the present invention that hinged sections 214 may be included in extension plate 220, and center section 224 which accommodates locking rods may also be used with the extension plate 210 shown in FIGS. 6A-6B.

Figure 7A:
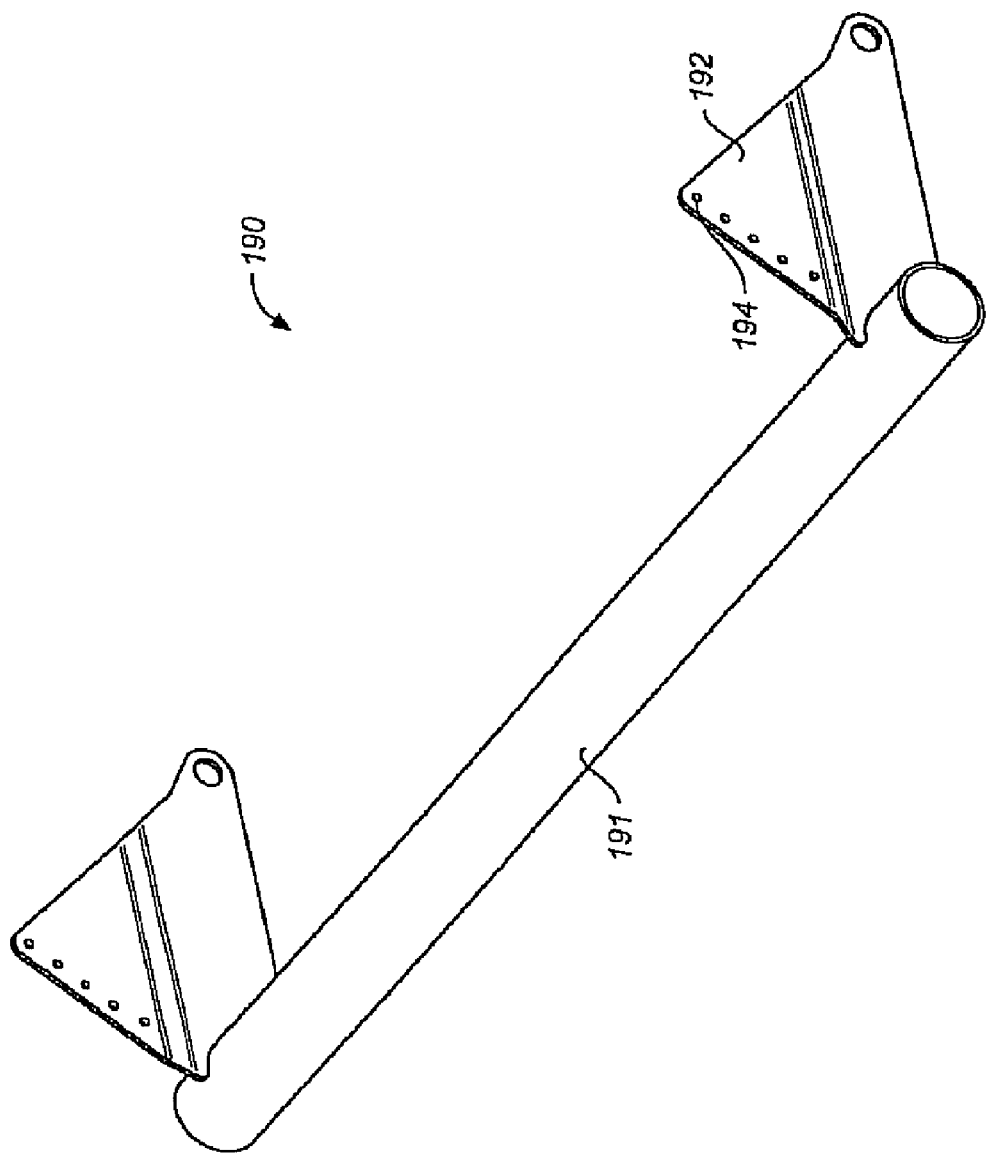
FIGS. 7A-7B show one embodiment of an underride in accordance with the present invention.
Figure 7B:
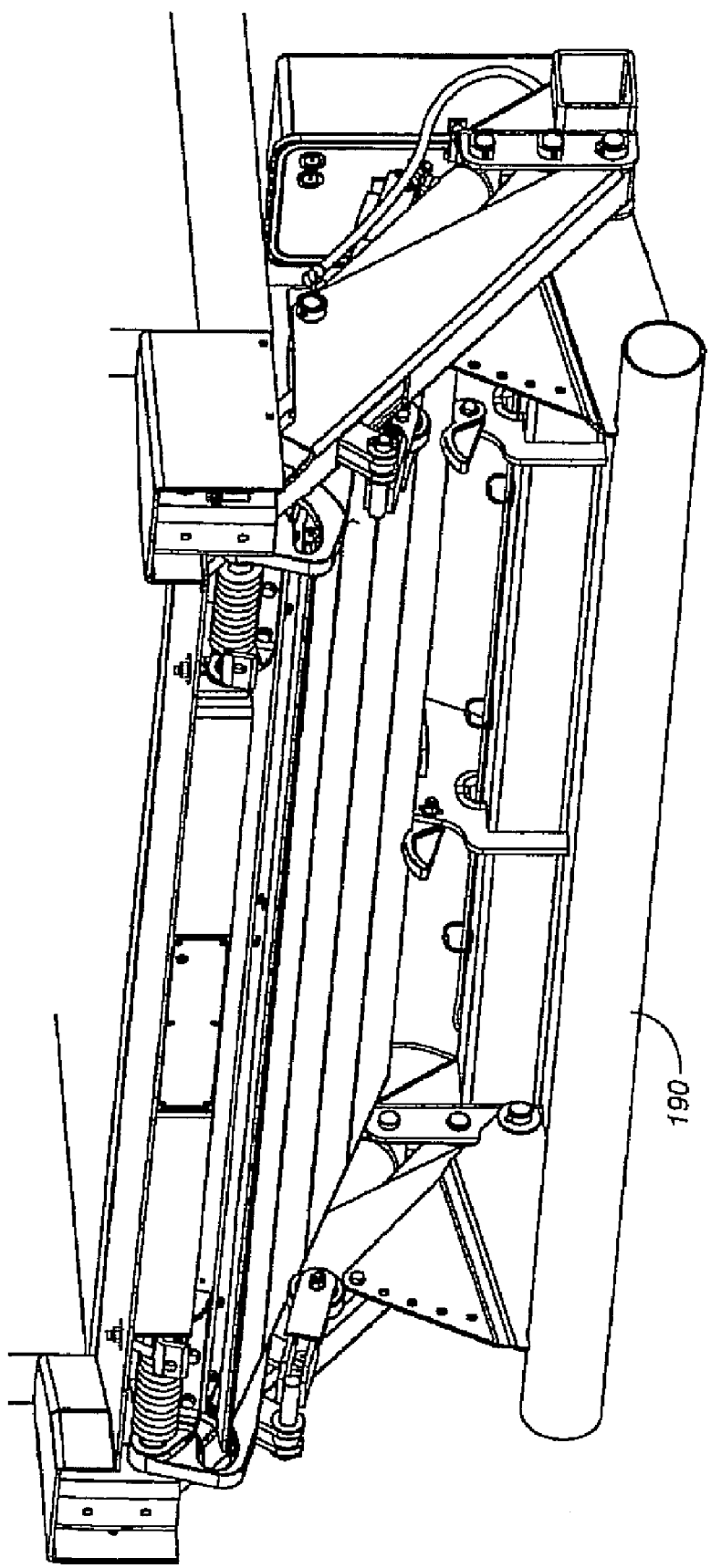

FIGS. 7A-7B show one embodiment of an underride 190 in accordance with the present invention. Underride 190 acts as a rear impact guard and prevents other vehicles from traveling underneath lift 100. Underride 190 includes an underride bar 191 which may be coupled to frame 130 by plates 192. Plates 192 may be coupled to frame 130 at the same point as lower arms 120. This transfers most or all of any impact force to underride 190 to frame 130 and not to lower arms 120. Plates 192 may include adjustment holes 194 which couple to lower arms 120 and allow underride 190 to be adjusted to a desired height. Underride 190 may also act as a synchronizing or balancing structure which minimizes binding or "walking" of upper arm 110 and lower arm 120 on each side of lift 100 as it is being operated.

Figures 2, 8A:
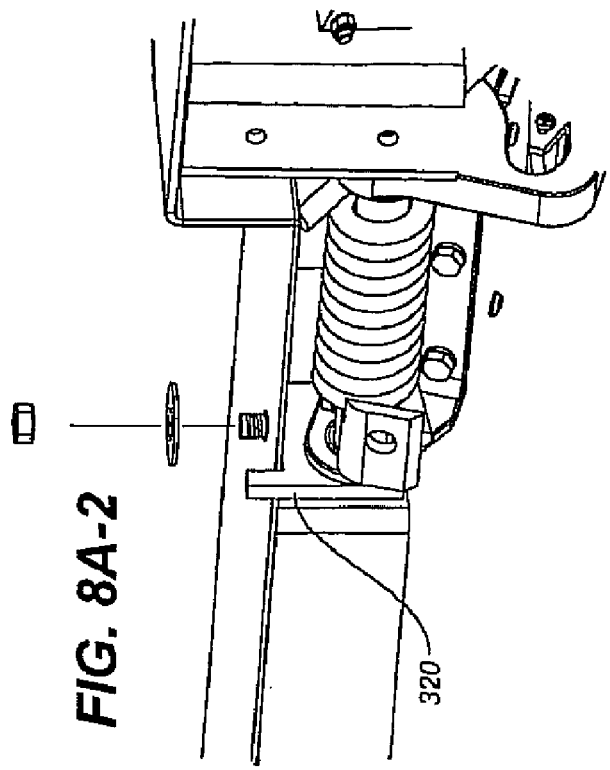
FIGS. 8A-8B shows one embodiment of how a lift in accordance with the present invention may be shipped and installed.
Figures 1, 8A:
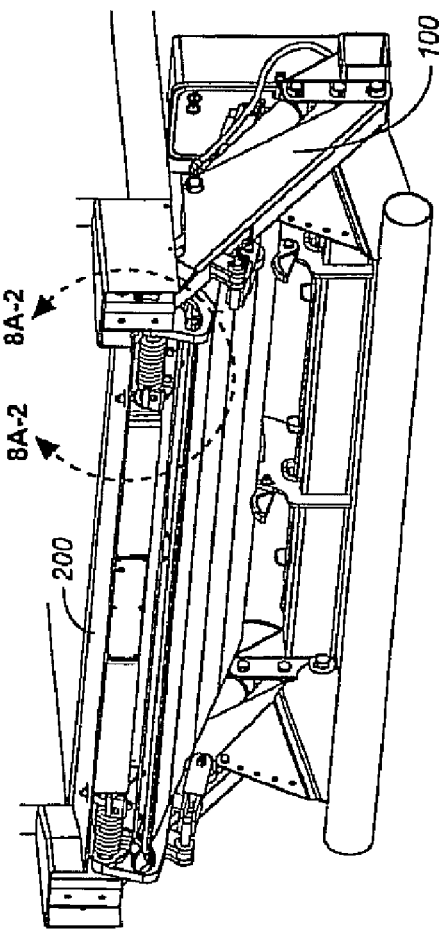
Figure 8B:
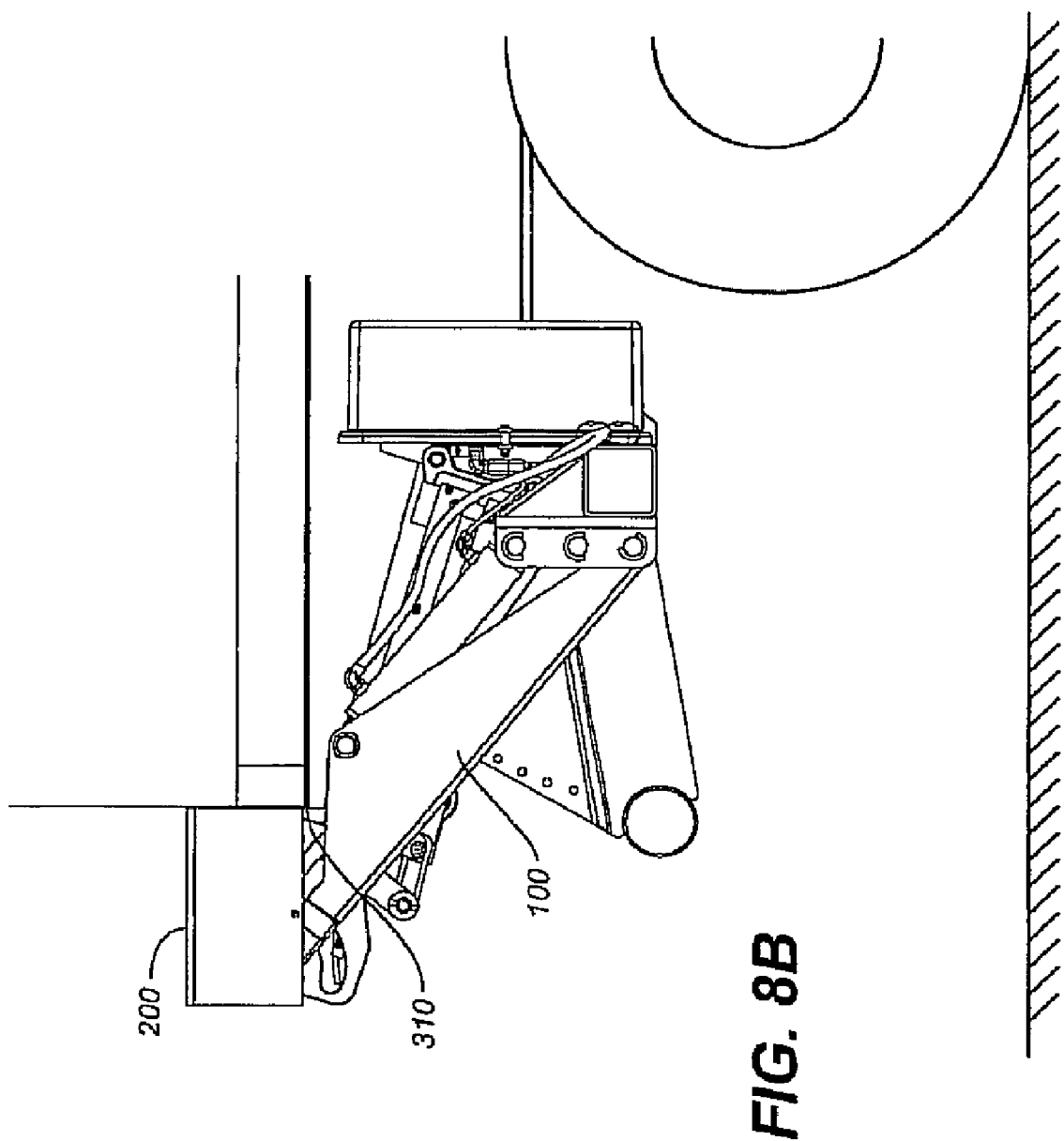

FIGS. 8A-8B shows how a lift 100 according to the present invention may be shipped as a package with extension plate 200 and then installed on a vehicle. In this manner, lift 100 and extension plate 200 may come pre-adjusted from the factory. Extension plate 200 may be held in the proper position with respect to the rest of lift 100 by a tack-weld 310 (FIG. 8B), an installation bracket 320 (FIG. 8A), or any other suitable fastener or removable coupling. To install lift 100 and extension plate 200, extension plate 200 is leveled before being welded or otherwise coupled to the vehicle, and then lift 100 is welded or otherwise coupled to the vehicle. After tack-weld 310 is cut and installation bracket 320 is removed, lift 100 has been properly installed. The installation of lift 100 and extension plate 200 are facilitated by the fact that lift 100 and extension plate 200 are shipped pre-adjusted, lift 100 and extension plate 200 do not need to be disassembled before installation, and once extension plate 200 has been properly coupled to the vehicle no further adjustment of lift 100 will typically be necessary before lift 100 can be coupled to the vehicle.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims. The scope of the invention is, therefore, indicated by the appended claims rather than the foregoing description. All changes which come within the meaning and range of equivalency of the claims are to be embraced within their scope.

What is claimed is:

1. A lift comprising:
 a first arm rotatably coupled to a frame, the first arm having at least one extension coupled thereto, the first arm being capable of rotating in a vertical plane;
 a second arm rotatably coupled to the frame, the second arm capable of rotating in substantially the same vertical plane; wherein the first aim at least partially encloses the second aim; and
 an actuator rotatably coupled to a frame, the actuator capable of rotating in substantially the same vertical plane, the actuator positioned above the second arm and being coupled to the at least one extension of the first arm.

2. The lift of claim 1, wherein the at least one extension is at least one plate.

3. The lift of claim 1, wherein the at least one extension and the first arm are one piece.

4. The lift of claim 1, wherein the first arm includes means for coupling to the actuator.

* * * * *

UNITED STATES PATENT AND TRADEMARK OFFICE
CERTIFICATE OF CORRECTION

| | | |
|---|---|---|
| PATENT NO. | : 7,931,433 B2 | Page 1 of 1 |
| APPLICATION NO. | : 12/420959 | |
| DATED | : April 26, 2011 | |
| INVENTOR(S) | : Karapet Ablabutyan et al. | |

It is certified that error appears in the above-identified patent and that said Letters Patent is hereby corrected as shown below:

Column 1 - Cross Reference to Related Applications:

Line 6: insert --co-pending-- before "U.S.".

Claim 1, Col. 7:

Line 11: "aim" should read --arm--; and

Line 12: "aim" should read --arm--.

Signed and Sealed this
Fourteenth Day of June, 2011

David J. Kappos
*Director of the United States Patent and Trademark Office*